US010587600B2

(12) United States Patent
Ignatchenko et al.

(10) Patent No.: US 10,587,600 B2
(45) Date of Patent: *Mar. 10, 2020

(54) SYSTEMS, METHODS AND APPARATUSES FOR DETERMINING PROXIMITY OF COMMUNICATION DEVICE

(71) Applicant: OLogN Technologies AG, Triesen/FL (LI)

(72) Inventors: Sergey Ignatchenko, Innsbruck (AT); Dmytro Ivanchykhin, Kiev (UA)

(73) Assignee: OLogN Technologies AG, Triesen/FL (LI)

( * ) Notice: Subject to any disclaimer, the term of this patent is extended or adjusted under 35 U.S.C. 154(b) by 0 days.

This patent is subject to a terminal disclaimer.

(21) Appl. No.: 15/989,335

(22) Filed: May 25, 2018

(65) Prior Publication Data

US 2018/0351933 A1 Dec. 6, 2018

Related U.S. Application Data

(63) Continuation of application No. 15/273,910, filed on Sep. 23, 2016, now Pat. No. 9,985,952, which is a (Continued)

(51) Int. Cl.
H04L 29/06 (2006.01)
H04W 12/06 (2009.01)

(52) U.S. Cl.
CPC .......... H04L 63/08 (2013.01); H04L 63/1466 (2013.01); H04W 12/06 (2013.01); G06F 2221/2111 (2013.01); H04L 2463/102 (2013.01)

(58) Field of Classification Search
CPC ............... H04L 63/08; H04L 63/1466; H04L 2463/102; H04W 12/06; G06F 2221/2111
See application file for complete search history.

(56) References Cited

U.S. PATENT DOCUMENTS 5,673,293 A    9/1997  Scarpa et al.
5,864,624 A    1/1999  Lukas et al.
(Continued)

FOREIGN PATENT DOCUMENTS

EP     2 071 787 A1       6/2009
WO   WO 2007/029863 A1   3/2007
WO   WO 2011/131745 A1  10/2011

OTHER PUBLICATIONS

U.S. Appl. No. 15/273,910, filed Sep. 23, 2016, Ignatchenko et al.
(Continued)

Primary Examiner — Catherine Thiaw
(74) Attorney, Agent, or Firm — Arnold & Porter Kaye Scholer

(57) ABSTRACT

The systems, methods and apparatuses described herein provide a computing device configured for ensuring its proximity to a communication partner. In one aspect, the computing device may comprise a communication port and a processor. The processor may be configured to receive a request from the communication partner via the communication port, send a response to the request to the communication partner, generate a secondary value that includes a selected portion of the request and a selected portion of the response, generate authenticating data to authenticate the secondary value and send the generated secondary value and authenticating data to the communication partner via the communication port. In another aspect, the communication partner is configured to ensure proximity of the computing device.

16 Claims, 9 Drawing Sheets

Related U.S. Application Data continuation of application No. 14/205,305, filed on Mar. 11, 2014, now Pat. No. 9,456,344, which is a continuation-in-part of application No. 14/204,973, filed on Mar. 11, 2014, now abandoned.

(60) Provisional application No. 61/792,996, filed on Mar. 15, 2013, provisional application No. 61/821,994, filed on May 10, 2013, provisional application No. 61/825,376, filed on May 20, 2013.

(56) References Cited

U.S. PATENT DOCUMENTS

| | | | |
|---|---|---|---|
| 6,058,121 | A | 5/2000 | Kim et al. |
| 6,853,616 | B1 | 2/2005 | Kim et al. |
| 6,976,168 | B1 | 12/2005 | Branstad et al. |
| 7,886,968 | B2 | 2/2011 | Shoemaker |
| 7,926,103 | B2 | 4/2011 | Aguilera et al. |
| 8,159,391 | B2 | 4/2012 | Papadimitratos et al. |
| 8,559,339 | B1 | 10/2013 | Talley et al. |
| 9,002,540 | B2 | 4/2015 | Ledendecker |
| 9,066,202 | B2 | 6/2015 | Dua et al. |
| 9,342,683 | B2 | 5/2016 | Weiss et al. |
| 10,085,136 | B2 | 9/2018 | Ignatchenko et al. |
| 2003/0048811 | A1 | 3/2003 | Robie, Jr. et al. |
| 2004/0019785 | A1 | 1/2004 | Hawkes et al. |
| 2004/0039946 | A1 | 2/2004 | Smith et al. |
| 2004/0193918 | A1 | 9/2004 | Green et al. |
| 2004/0250074 | A1 | 12/2004 | Kilian-Kehr |
| 2004/0264372 | A1 | 12/2004 | Huang |
| 2005/0172333 | A1 | 8/2005 | Kim |
| 2005/0273608 | A1 | 12/2005 | Kamperman |
| 2006/0044108 | A1 | 3/2006 | Nowottnick |
| 2006/0239453 | A1 | 10/2006 | Halpern |
| 2006/0248340 | A1 | 11/2006 | Lee et al. |
| 2007/0058559 | A1 | 3/2007 | Xu |
| 2007/0217343 | A1 | 9/2007 | Znamova |
| 2007/0259693 | A1 | 11/2007 | Brunel et al. |
| 2007/0294645 | A1* | 12/2007 | Medvinsky ............ G06F 21/10 715/862 |
| 2007/0300070 | A1 | 12/2007 | Shen-Orr |
| 2008/0013640 | A1 | 1/2008 | Lu et al. |
| 2008/0031136 | A1 | 2/2008 | Gavette et al. |
| 2008/0157929 | A1 | 7/2008 | Hilgers et al. |
| 2008/0281600 | A1 | 11/2008 | Kuppuswamy et al. |
| 2009/0225669 | A1 | 9/2009 | Qin et al. |
| 2009/0275352 | A1 | 11/2009 | Kim et al. |
| 2009/0319656 | A1 | 12/2009 | Yang et al. |
| 2010/0008252 | A1 | 1/2010 | Alve |
| 2011/0078549 | A1 | 3/2011 | Thueringer et al. |
| 2011/0170532 | A1 | 7/2011 | Tchepnda et al. |
| 2011/0202766 | A1 | 8/2011 | Lerner |
| 2011/0302653 | A1 | 12/2011 | Frantz et al. |
| 2012/0023568 | A1 | 1/2012 | Cha et al. |
| 2012/0134687 | A1 | 5/2012 | Jones et al. |
| 2012/0151210 | A1 | 6/2012 | Perez |
| 2012/0307712 | A1 | 12/2012 | Watanabe |
| 2013/0010617 | A1 | 1/2013 | Chen et al. |
| 2013/0050080 | A1 | 2/2013 | Dahl et al. |
| 2013/0102252 | A1* | 4/2013 | Rasmussen ............ H04K 1/04 455/41.2 |
| 2013/0116964 | A1 | 5/2013 | van Roermund et al. |
| 2013/0198797 | A1 | 8/2013 | Raghuram et al. |
| 2013/0208893 | A1 | 8/2013 | Shablygin et al. |
| 2013/0212704 | A1 | 8/2013 | Shablygin et al. |
| 2013/0251152 | A1 | 9/2013 | Roelse et al. |
| 2013/0276064 | A1 | 10/2013 | Ignatchenko |
| 2013/0276081 | A1 | 10/2013 | Weiss et al. |
| 2013/0283361 | A1 | 10/2013 | Rao et al. |
| 2013/0287011 | A1 | 10/2013 | Zhao |
| 2014/0074719 | A1 | 3/2014 | Gressel et al. |
| 2014/0082696 | A1 | 3/2014 | Danev et al. |
| 2014/0214687 | A1 | 7/2014 | Huxham |
| 2014/0223553 | A1 | 8/2014 | Gupta et al. |
| 2014/0274111 | A1 | 9/2014 | Edge et al. |
| 2014/0282875 | A1 | 9/2014 | Ignatchenko et al. |
| 2014/0282906 | A1 | 9/2014 | Ignatchenko et al. |
| 2014/0282907 | A1 | 9/2014 | Ignatchenko et al. |
| 2014/0282947 | A1 | 9/2014 | Ignatchenko et al. |
| 2014/0304798 | A1 | 10/2014 | Iyengar et al. |
| 2014/0334466 | A1 | 11/2014 | Ignatchenko et al. |
| 2015/0082427 | A1 | 3/2015 | Ivanchykhin et al. |
| 2015/0244685 | A1 | 8/2015 | Shah et al. |
| 2017/0078263 | A1 | 3/2017 | Ignatchenko et al. |
| 2017/0099569 | A1 | 4/2017 | Ignatchenko et al. |

OTHER PUBLICATIONS

U.S. Appl. No. 15/274,290, filed Sep. 23, 2016, Ignatchenko et al.
U.S. Appl. No. 61/623,861, filed Apr. 13, 2012, Ignatchenko.
U.S. Appl. No. 61/792,996, filed Mar. 15, 2013, Ignatchenko et al.
U.S. Appl. No. 61/825,376, filed May 20, 2013, Ignatchenko et al.
Anderson, "Security Engineering: A Guide to Building Dependable Distributed Systems," Protocols, Chapter 2, pp. 13-33 (2008) <www.cl.cam.ac.uk/~rja14/Papers/SE-02.pdf>.
Bahr et al., "Minimizing Trilateration Errors in the Presence of Uncertain Landmark Positions," *EMCR*, pp. 1-6 (2007).
Brands et al., "Distance-Bounding Protocols," *Pro. Advances in Cryptology (EUROCRYPT\'93)*, pp. 344-359 (1994) <http://citeseerx.ist.psu.edu/viewdoc/download?doi=10.1.1.51.6437&rep=repl&type=pdf>.
Čapkun et al., "Secure positioning of wireless devices with application to sensor networks," *INFOCOM 2005, 24th Annual Joint Conference of the IEEE Computer and Communications Societies, Proceedings IEEE*, 3:1917-1928 (2005).
Clulow et al., "So Near and Yet So Far: Distance-Bounding Attacks in Wireless Networks," *ESAS' 2006 Proceedings of the Third European Conference on Security and Privacy in Ad-Hoc and Sensor Networks*, pp. 83-97 (2006).
Cremers et al., "Distance Hijacking Attacks on Distance Bounding Protocols," *ETH Zurich, Institute of Information Security*, Switzerland, pp. 1-35 (2012) <http://eprint.iacr.org/2011/129.pdf>.
Francis et al., "Practical Relay Attack on Contactles Transactions by Using NFC Mobile Phones," *The 2012 Workshop on RFID and IoT Security (RFIDsec2012 Asia)*, Editors / Nai-Wei Lo; Yingjiu Li., IOS Press, 8:21-32 (2012).
Hancke et al., "Attacks on Time-of-Flight Distance Bounding Channels," *Proceedings of 1st ACM Conference on Wireless Network Security*, pp. 194-202 (2008).
Hancke et al., "Security of Proximity Identification Systems," *Technical Report No. 752, University of Cambridge Computer Laboratory*, pp. 1-161 (2009).
"Information technology—Identification cards—Integrated circuit(s) cards with contacts—Part 3: Electronic signals and transmission protocols," *ISO/IED 7816-3: 1997/PDAM-2, ISO/IEC*, 16 pgs. (2002).
International Search Report and Written Opinion dated Aug. 7, 2014, as received in International Application No. PCT/IB2014/059542.
International Search Report and Written Opinion dated Aug. 7, 2014, as received in International Application No. PCT/IB2014/061347.
International Search Report and Written Opinion dated Jan. 8, 2015, as received in International Application No. PCT/IB2014/064606.
International Search Report and Written Opinion dated Jul. 7, 2014, as received in International Application No. PCT/IB2014/059537.
Jung, "SSL/TLS," *CS 686 Special Topics in Computer Science: Privacy and Security, Department of Computer Science, University of San Francisico*, pp. 1-18 (2010) <http://www.cs.usfca.edu/~ejung/courses/686/lectures/10SSL.pdf>.
Man-in-the-middle attack, n.d., Web, Oct. 27, 2015, Wiki: <http://en.wikipedia.org/wiki/Mafia_Fraud_Attack>.
Meadows et al., "Distance Bounding Protocols: Authentication Logic Analysis and Collusion Attacks," *Advances in Information Security*, 30:279-298 (2007).

(56) References Cited

OTHER PUBLICATIONS

Singelee et al., "Location Verification using Secure Distance Bounding Protocols," *Proc. IEEE International Conference Mobile Ad hoc and Sensor Systems*, pp. 840-846 (2005).

Thorbjornsen et al., "Radio Frequency (RF) Time-of-Flight Ranging for Wireless Sensor Networks," *Meas. Sci. Technol.*, 21(3):1-22 (2010) <http://eprints.soton.ac.uk/268352/1/rf_time-of-flight_ranging.pdf>.

Yang et al., "Quality of Trilateration: Confidence based Iterative Localization," *IEEE Transactions on Parallel and Distributed Systems*, 21(5):631-640 (2010).

* cited by examiner

SYSTEMS, METHODS AND APPARATUSES FOR DETERMINING PROXIMITY OF COMMUNICATION DEVICE

RELATED APPLICATIONS

This application is a continuation of U.S. application Ser. No. 15/273,910 (the '910 application), entitled "Systems, Methods and Apparatuses for Determining Proximity of Communication Device," filed Sep. 23, 2016. The '910 application is a continuation of U.S. application Ser. No. 14/205,305 (the '305 application), entitled "Systems, Methods and Apparatuses for Ensuring Proximity of Communication Device," filed Mar. 11, 2014 (issued as U.S. Pat. No. 9,456,344). The '305 application is a continuation-in-part of U.S. application Ser. No. 14/204,973 (the '973 application), entitled "Systems, Methods and Apparatuses for Ensuring Proximity of Communication Device," filed Mar. 11, 2014 (abandoned). The '305 application also claims priority to U.S. Provisional Application No. 61/792,996, filed Mar. 15, 2013, No. 61/821,994, filed May 10, 2013, and No. 61/825,376, filed May 20, 2013, all entitled "Systems, Methods and Apparatuses for Ensuring Proximity of Communication Device." The contents of each of the above-mentioned non-provisional and provisional applications is hereby incorporated by reference in their entirety.

FIELD OF THE DISCLOSURE

The systems, methods and apparatuses described herein relate to data communication between electronic devices, and in particular, ensuring that communication devices are within a predetermined proximity of one another.

BACKGROUND

There is a need in the art to determine whether two devices that are communicating with one another are within a predetermined proximity of each other. This need may be based on a desire to ensure that two devices remain physically proximate, or based on a desire to enhance security by reducing the possibility of certain types of malicious attacks. With respect to the former, for example, one may want to ensure that an electronic monitoring device worn by a person on bail, or an electronic tracking device located on an automobile, remains within a predefined or predetermined distance of a monitoring station or monitoring terminal.

With respect to the latter scenario, while physical proximity of devices communicating with one another may enhance the security of the communication there is a need to ensure that the devices are actually proximate. For example, ultra-short range communication technologies (such as, for example, Near-Field Communication (NFC)) may be used in the process of establishing a secure communication channel between two devices. As one example, two devices with ultra-short range communication capabilities may be brought next to each other to exchange encryption keys for establishing a secure sockets layer (SSL) session. Due to the physical constraints of such ultra-short range communication methods, it is believed that the key exchange can only happen between devices that are physically located next to each other. However, various attacks still may pose serious security threats. For example, a relay attack (a variation of the man-in-the-middle attack) may be performed by using a fake terminal or hot spot equipped with signal re-transmitters to re-transmit the communication signal while the legitimate communication partner may be located far away.

Therefore, there is a need in the art for ensuring a communication partner at the other end of a communication link is within a predefined physical proximity.

DETAILED DESCRIPTION

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

Figure 1:
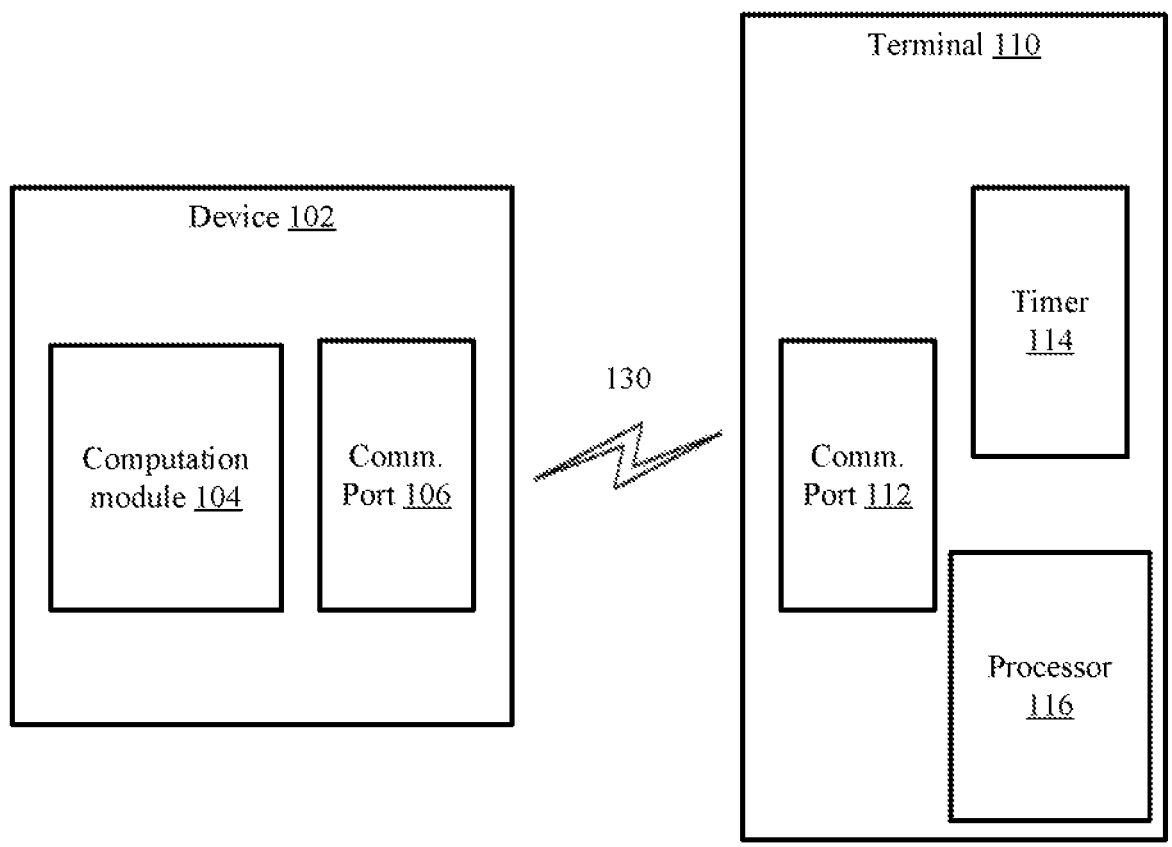
FIG. 1 is a block diagram of an exemplary system according to the present disclosure.

Without being limiting, FIG. 1 shows an exemplary system 100 according to the present disclosure. The system 100 may comprise a device 102 and a terminal 110. The device 102 may comprise a computation module 104 and a communication port 106. The terminal 110 may comprise a communication port 112, a timer (or counter) 114 and a processor 116. Although the timer (or counter) 114 is shown as a separate component, in certain embodiments, the timer 114 may be implemented as part of the processor 116 (e.g., in software or hardware), or may be integrated into other components of the terminal 110.

The communications ports 106 and 112 may communicate by establishing a communication link 130. The link 130 may be a wireless communication link, a wired communication link or a combination of both. As a non-limiting example, the communication ports 106 and 112 may be compatible ultra-short range (e.g., NFC or capacitance-based transceivers), short range (e.g., WiFi or Bluetooth transceivers), or long range (e.g., radio transceivers) communication ports that may be used to establish a wireless communication link 130 when the communication ports 106 and 112 are physically within a distance sufficient to establish a communication link. Those with skill in the art recognize that this distance may vary depending on the specific communication link utilized (e.g., NFC, Bluetooth, WiFi, radio, etc.). As another non-limiting example, the communication ports 106 and 112 may be communication interfaces for wired links, such as, USB connectors, IEEE 1394, RJ-45, etc., and the link 130 may be a wired link between the device 102 and the terminal 110.

It is to be understood that the systems, methods and apparatuses of the present invention are broad enough to be applicable to any two electronic devices capable of communicating with one another (either directly or indirectly), and that they are not limited to any specific communication technology or implementation. For purposes of illustration only, the device 102 may be a mobile device (such as a mobile phone) or a key-card, and the terminal 110 may be a key card reader terminal. As another example, the device 102 may be a tracking device located on a car or carried by a person on bail, and the terminal 110 may be a monitoring station. It is also to be understood that the terminal 110 need not be a stationary device and that it, too, may be implemented in a mobile or portable form factor.

The computation module 104 may be used for fast computation of functions (e.g., functions F1, F2A, and/or F3 as described herein) and for other operations related to verifying proximity that are discussed herein. The computation module 104 may be implemented as an Application-Specific Integrated Circuit (ASIC), a field-programmable gate array (FPGA), a microcontroller, or a program running on a generic CPU. In some embodiments, an ASIC-based implementation may have an advantage because it may be faster than other implementations and may reduce the processing time.

As discussed above, there are advantages to ensuring that two devices are within a predefined distance or proximity of one another (e.g., monitoring a vehicle or a person). However, the ability to verify the proximity of the device 102 to the terminal 110 also may be used to reduce the possibility of certain types of malicious attacks. In one exemplary relay attack scenario, an attacker may use a specially constructed fake device (which may also be referred to as an attacker's device) to mislead the terminal 110 to communicate with the attacker's device. The attacker's device may in turn be connected to a remote terminal under control of the attacker, i.e., an attacker remote terminal. The attacker's device may communicate the information it receives from the terminal 110 to the attacker remote terminal using any communication link suitable for the attacker. The attacker remote terminal may in turn be positioned to communicate with a legitimate device 102. Consequently, during an attack, while the terminal 110 may appear to be communicating with a device that is in close physical proximity to it (i.e., the attacker's device), it in fact may be exchanging information with a valid device 102 that may be physically located in any arbitrary location (e.g., many hundreds or thousands of kilometers away). Moreover, the information exchanged between the legitimate device 102 and terminal 110 may pass through and may be accessed by the attacker's device and attacker remote terminal, and thus is susceptible to interception and misuse.

Figure 2A:
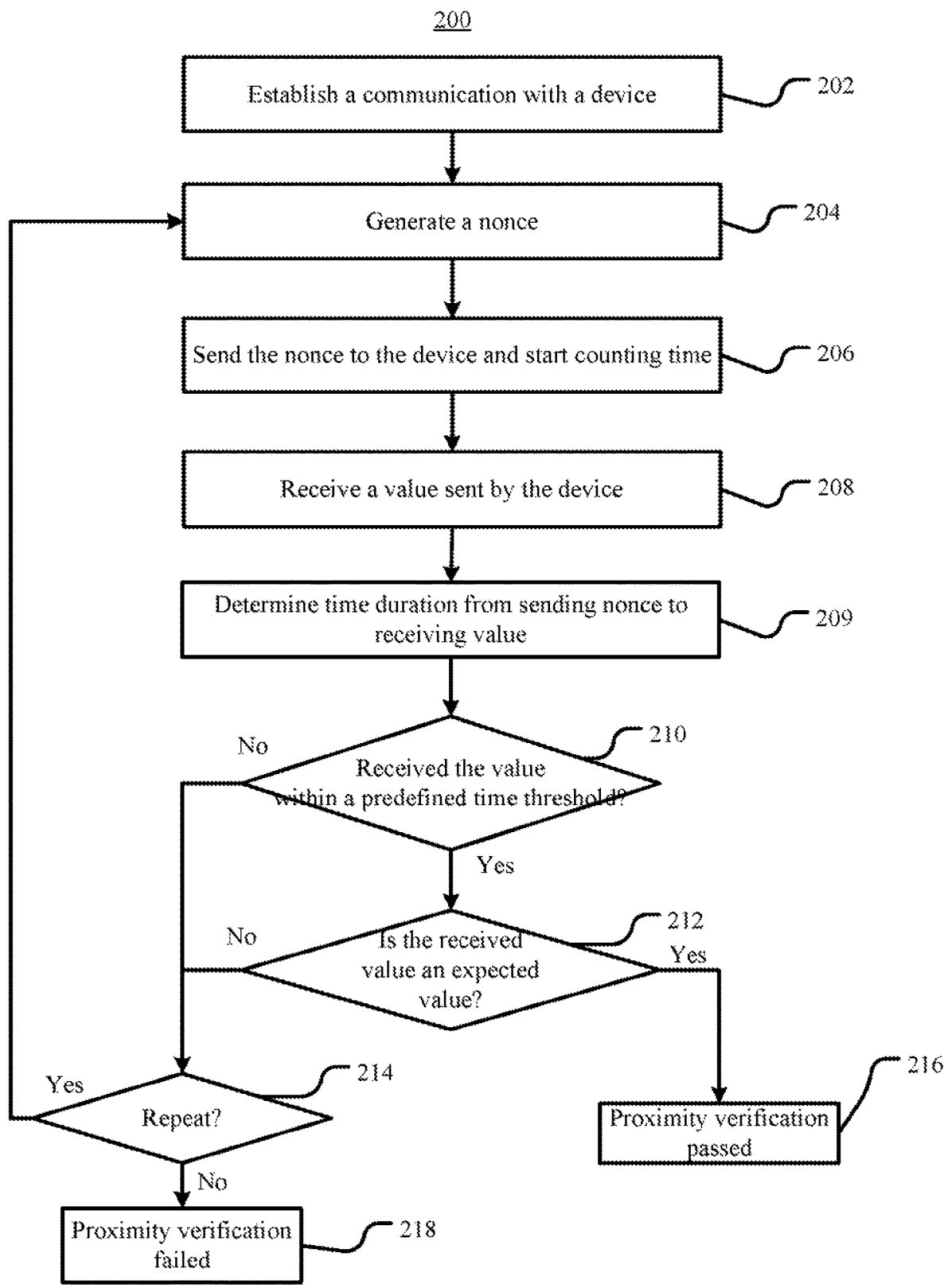
FIG. 2A is a flow diagram illustrating an exemplary method for verifying a communication partner according to the present disclosure.

FIG. 2A illustrates an exemplary method 200 that may be implemented by the terminal 110 to verify the proximity of the device 102 (e.g., to determine whether a device 102 is within or outside a predetermined or predefined physical proximity of the terminal 110). The method 200 may start at block 202, at which the terminal 110 may establish a communication link 130 with the device 102 to communicate data between the device and the terminal. The details of establishing such a data connection may depend on the particular type of wireless or wired (or combination of both) communication link 130 used in a particular implementation. In addition, an optional logical channel (such as TCP connection, X.25 connection, Sequenced Packet Exchange (SPX) connection, High-Level Data Link Control (HDLC) connection, SSL/TLS connection over any of these connections, or similar connection; in some embodiments, logical channel may consist of multiple TCP connections, X.25 connections, Sequenced Packet Exchange (SPX) connections, High-Level Data Link Control (HDLC) connections, SSL/TLS connections, other similar connections, or combinations of them) may be established over the communication link 130.

At block 204, a nonce may be generated. For example, a cryptographically safe random number generator (implemented in hardware, not shown, or implemented in software running on the processor 116) may be used for this purpose. At block 206, the generated nonce may be sent to the device 102 as a request and the timer 114 may be started to count time from when the nonce is sent.

Figure 2B:
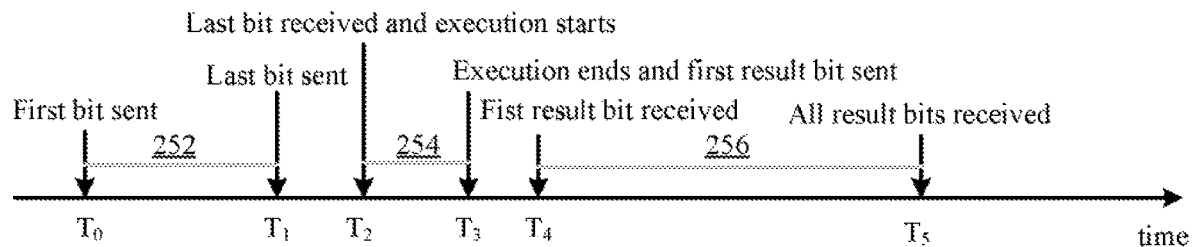
FIG. 2B is a timing diagram illustrating a sequence of events for verifying a communication partner according to the present disclosure.
Figure 2C:
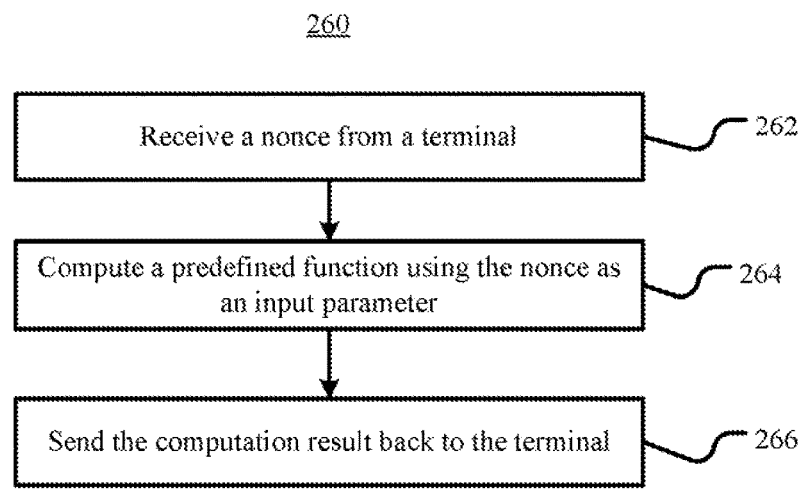
FIG. 2C is a flow diagram illustrating an exemplary method for a communication partner to be verified according to the present disclosure.

In one embodiment, the device 102 may receive the nonce, compute a predefined function F1 on this nonce and send the computed value back to the terminal 110 as a verification value. FIG. 2C is a flow diagram illustrating an exemplary method 260 for the device 102 to be verified according to the present disclosure. As shown in FIG. 2C, at block 262, the device 102 may receive a nonce from a terminal. Then at block 264, a predefined function F1 may be computed. In one embodiment, the function F1 may be selected such that to start its computation all bits of the nonce are necessary, and the resulting bits are obtained simultaneously. By way of example and not limitation, the function F1 may be a cryptographic hash function, such as SHA-0, SHA-1, SHA-2 or SHA-256, or an encryption function such as the Advanced Encryption Function (AES) algorithm. As discussed herein, to demonstrate its proximity to the terminal 110, the device 102 may need to perform such operations as quickly as possible. Then the method 260 may proceed to block 266, at which the computation result may be sent back from the device 102 to the terminal 110 as the verification value and also as a response to the request.

Referring back to the method 200 in FIG. 2A, at block 208, a value may be received by the terminal 110. The value may be the verification value generated by the device 102 at block 264. At block 209, the time at which the value is received is determined and a time duration between when the nonce was sent and the value received is determined or calculated. At block 210, the time duration between the nonce being sent and the verification value being received may be compared to a predefined or predetermined time threshold $T_{th}$. The predefined (or predetermined) time threshold $T_{th}$ may be selected (or calculated) as a sum of reasonably expected times necessary for (i) transmitting the nonce from the terminal 110 to the device 102, (ii) calculating the value of function F1 by the device 102, and (iii) transmitting the calculated value back to the terminal 110.

The time threshold $T_{th}$ may be selected as (or calculated to be) any finite duration of time appropriate to the particular implementation of a system, method and/or apparatus according to the present disclosure. As discussed herein, the time threshold may be in the order of microseconds (or even nanoseconds). When implementing a terminal 110 and/or a device 102 according to the present disclosure, one may take into account, in part, the transmission rate of the communication link(s) expected to be used between the terminal and the device, and a minimum time that is likely to be required for the device (or the terminal) to calculate the predetermined function, to select a time threshold $T_{th}$ that will ensure that the device and terminal are within a predetermined physical proximity to each other. It should be clear from the examples discussed herein that what constitutes an appropriate predetermined or predefined proximity depends on the specific implementation in which the systems, methods and apparatuses of the present invention are utilized. For example, in the context of monitoring a vehicle or a person on bail, distances in the order of tens or hundreds (or even thousands) of kilometers may be appropriate. In the context of preventing a relay attack when using a keycard at a key reader, however, distances in the order of a meter or less may be more appropriate. These examples, however, are not intended to narrow the scope of the present invention and any predetermined or predefined proximal distance may be selected based on the specific implementation and design choices made therein.

In one exemplary implementation, the predetermined time threshold $T_{th}$ may be used to verify that the device 102 is within (or outside) a predetermined or predefined physical proximity to the terminal 110. The maximal possible distance between the terminal 110 and device 102 may be calculated as $(C*T_{th})/2$, where C is the speed of light. For example, if the time threshold $T_{th}$ is 100 microseconds (μs) or less, the maximal distance between two communicating devices may be approximately (300,000 km/s *100 μs)/2=15 km. Such a time threshold may be appropriate, for example, in the context of monitoring a person on bail or monitoring an automobile to ensure that he or it remains within a predefined physical proximity of the terminal 110 (in this context and example, within 15 km of the terminal).

Setting an appropriate time threshold $T_{th}$ may also significantly reduce or eliminate the possibility of a man-in-the-middle attack as described above, or variations thereof. For example, if the time threshold $T_{th}$ is 1 microsecond (μs) or less, the maximal distance between two communicating parties may be approximately (300,000 km/s *1 μs)/2=150 meters, which effectively excludes attackers that use a fake device to retransmit information to the device 102 located more than 150 meters away from the terminal 110.

In another example, setting the time threshold $T_{th}$ to a duration in the order of 10 ns reduces the maximal possible attack radius to approximately 1.5 meters (i.e., (300,000 km/s *10 ns)/2=1.5 m). In many cases, such a time threshold value may make all practically possible relay attacks useless. Moreover, as a practical matter the maximum possible distance between the terminal 110 and the device 102 may be even less because some amount of the time will need to be spent performing the predefined function F1 (and there may be additional delays introduced by the attacker device and terminal). For example, if $T_{th}$ is in the order of 10 ns and it is known that the function F1 cannot be calculated faster than 4 ns in any reasonably available implementation, then the maximum possible radius may be evaluated as (300,000 km/s *(10 ns−4 ns))/2=0.9 m because only 6 ns (i.e., 10 ns−4 ns) remain available for data transmission from the terminal 110 to the device 102 and back. Thus, the possibility of implementing a man-in-the-middle attack using an attacker's device and an attacker remote terminal may be greatly reduced or eliminated.

It is to be understood that ensuring or verifying that two devices are within a predetermined proximity and reducing or eliminating the risk of relay attacks may be complimentary applications of the systems, methods and apparatuses of the present disclosure. For example, the present disclosure may be applicable to ensure not only that a monitored vehicle is within a predetermined proximity of a monitoring station, but that malicious or unauthorized relay techniques are not used to mislead the monitoring station into believing that the monitored vehicle is within the predefined proximity when in fact it is not.

In embodiments in which the predefined function F1 satisfies the characteristics stated above (all bits of the result are computed simultaneously only after all bits of the argument are available), the time duration between sending the nonce and receiving the verification value can be measured as a time between sending the last bit of the nonce and receiving the first bit of the verification value. FIG. 2B explains this approach in greater detail. As shown in FIG. 2B, at a time $T_0$, the first bit of the nonce may be sent by the terminal 110 and at a time $T_1$ the last bit (and, therefore, all bits) of the nonce may have been sent. The time duration 252 is thus the time elapsed from the first bit being sent to the last bit being sent. Then at a time $T_2$ all bits may be received by the device 102 and the function F1 may start. At a time $T_3$ the computation of F1 may end. Thus, the function F1 may take a time duration 254 to complete. Also, at the time $T_3$, the first result bit may be sent by the device 102 back to the terminal 110. The first result bit may be received by the terminal 110 at a time $T_4$ and the last result bit may be received at time $T_5$, and the time duration 256 is thus the time elapsed from the first result bit being received to the last result bit being received. The times and time durations discusses herein may be relative times and need not correspond to real world time.

The time durations 252 and 256 may depend on the nature of the communication link 130 and, in particular, may depend on the transmission rate achievable by the communication link. For example, if the link 130 is based on Near Field Communication (NFC), then the transmission rate may range from 106 kbit/s to 424 kbit/s. If the transmission rate is 424 kbit/s, transmitting a single bit may take 1/424000 second=2.4 μs and for a nonce of 128 bits, transmitting all bits of the nonce may take approximately 300 μs. In this example, if the time is measured from sending the first bit of the nonce (at the time $T_0$) until receiving the last bit of the result (at the time $T_5$), then $T_{th}$ may not be less than 600 μs (300 μs for transmitting all bits of nonce, 300 μs for transmitting all bits of the result, plus any time necessary to calculate the function F1). A $T_{th}$ of 600 μs, however, may only ensure that the device 102 is located within the distance of (300,000 km/s *600 μs)/2=90 km. However, if the time is measured from sending the last bit of the nonce (at the time $T_1$) until receiving the first bit of the result (at the time $T_4$), then the time threshold may be set at a much lower duration.

For example, if F1 is estimated to require 1.2 μs to be calculated, then $T_{th}$ may be as low as 6 μs. It should be noted that in a number of cases the function F1 may be computed in 1 μs or less, especially if an ASIC or some other form of hardware acceleration is used. This value of $T_{th}$ of less than 6 μs may ensure the device 102 may be located within a distance of (300,000 km/s *6 μs)/2=0.9 km, which is 100 times less than in the first case. It should be noted that it may be possible to achieve smaller or shorter predefined proximity by increasing the data transmission rate (and/or frequency) of the communication link 130.

Returning back to the method 200 of FIG. 2, if the time check at block 210 passes successfully, then, at block 212, the received value may be compared to an expected value. For example, the terminal 110 may compare the received verification value to a value of the predefined function F1 calculated by the terminal 110 itself. If both checks at blocks 210 and 212 pass, at block 216, the method 200 may determine that the proximity verification has passed, and that the device 102 is within a predefined proximity of the terminal 110. If either the time check at block 210 or the value check at block 212 fails, the method 200 may determine at block 218 that the proximity verification has failed. For example, if the time check at block 210 or the value check at block 212 fails, the terminal 110 may determine that there is a possibility that the communication link 130 or the logical channel established over the communication link 130 has been compromised or that the device 102 may be a fake device.

In one or more embodiments, to handle occasional communication errors, the method 200 may attempt to repeat the blocks 204-212 as indicated by block 214, which may be optional. In some embodiments, the number of retransmission attempts may be limited (for example, to a number like 3 or 5 times).

In some embodiments, the same process 200 may be initiated by the device 102 to ensure that the terminal 110 is in close proximity. In certain embodiments, the same process 200 may be performed by both sides (while the other communication party performs the method 260) for mutual proximity verification.

It should be noted that if the function F1 is known to the attacker, then the method 200 shown on FIG. 2 may still be subject to an attack by implementing the function F1 within a fake device (and, thus, bypass device 102 entirely) and thereby avoiding communication delays and circumventing the system. To address this type of attack, an apparatus (e.g., a device 102 or terminal 110) according to an exemplary embodiment of the present disclosure may store apparatus-specific encryption keys (that, in some embodiments, may be additionally certified by a trusted third party). Examples of such apparatuses may include any apparatuses that include apparatus-specific private keys in software (operating system or software application) or hardware (non-volatile memory or circuitry), apparatuses with an integrated Trusted Platform Module (TPM), and electronic apparatuses with a secure zone such as that described in U.S. Provisional Patent Application No. 61/623,861, entitled "Secure Zone for Digital Communications," and filed on Apr. 13, 2012, the entirety of which is incorporated herein by reference.

Figure 3A:
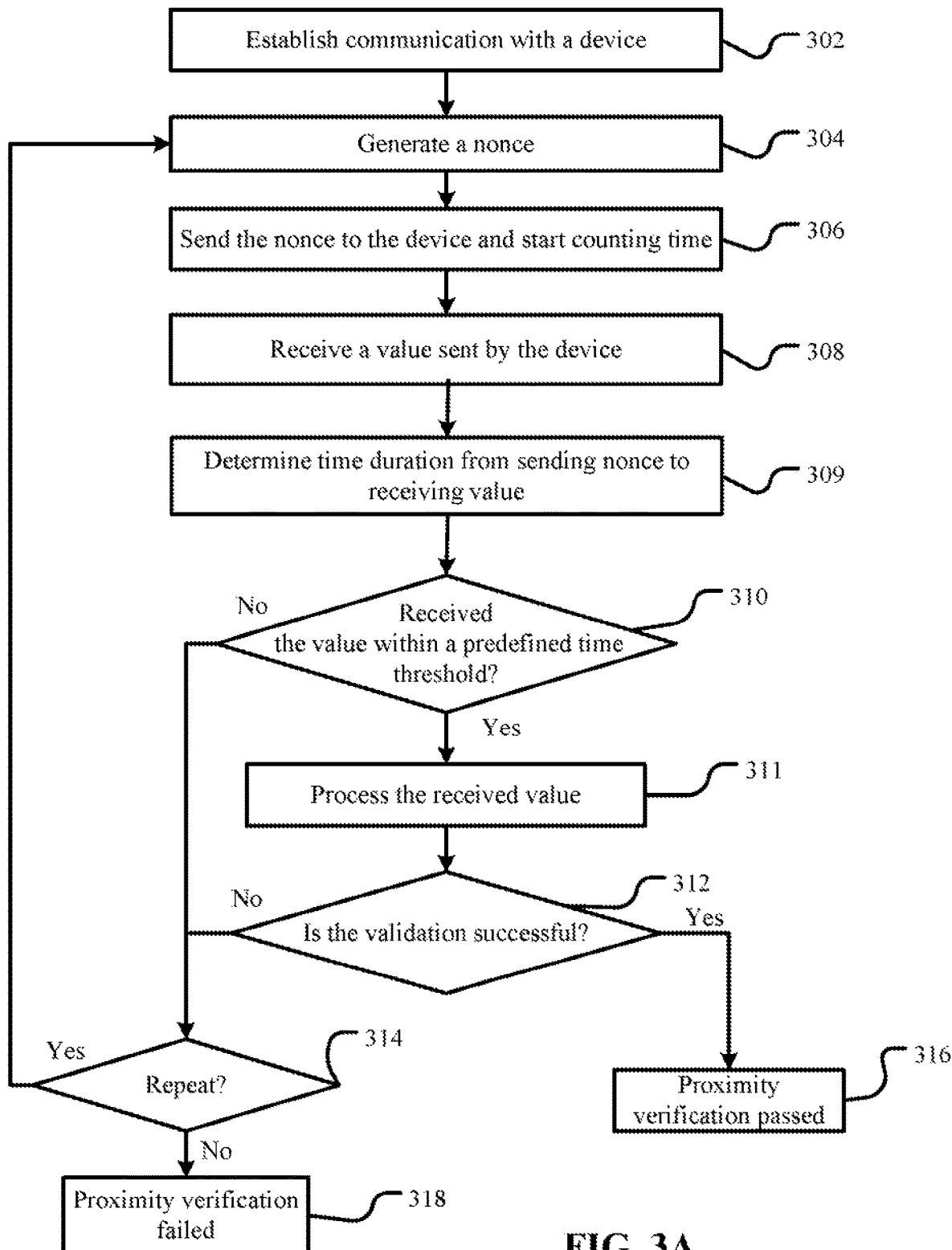
FIG. 3A is a flow diagram illustrating another exemplary method for verifying a communication partner according to the present disclosure.

If the device 102 stores apparatus-specific encryption keys, the device 102 and terminal 110 may implement an extension of the method 200. The extended method may use encryption/decryption for verification to ensure that the device 102, which has a specific private key (for example, the one that corresponds to a certified public key), is located in close proximity to the terminal 110. This may be achieved, for example, by an exemplary method 300 according to the present disclosure shown in FIG. 3.

The method 300 may be an extended version of the method 200 and may be implemented when the device 102 stores or includes an apparatus-specific encryption key, and the terminal 110 has the capability to verify the apparatus-specific encryption key of the device 102. For example, the terminal 110 may have a public key of the device 102 that corresponds to a private key stored at the device 102. Such public key, for example, may be hardcoded into the terminal 110, or may be obtained from another party. If the public key is obtained from another party, the public key may come with a certificate signed by a trusted third party.

At block 302, a communication link (e.g., the link 130 and optional logical channel over the link 130) may be established between the terminal 110 and the device 102, for example, similar to that established in block 202 of the method 200 shown in FIG. 2. At block 304, a nonce may be generated, for example, in a manner similar to block 204 of the method 200 shown in FIG. 2. At block 306, the generated nonce may be sent to the device 102 as a request and the terminal 110 may start counting time from when the nonce is sent. In one non-limiting embodiment, the time may start to be counted when the last bit of the nonce is sent.

Figure 3B:
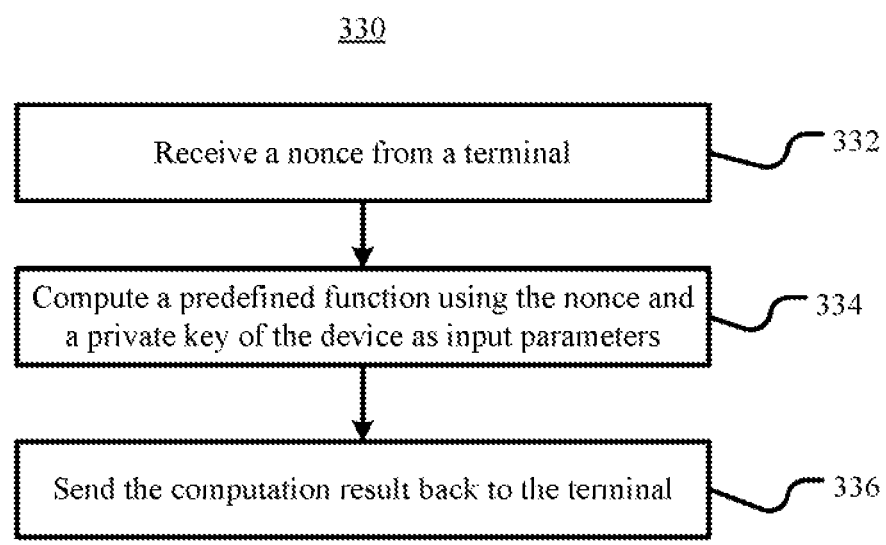
FIG. 3B is a flow diagram illustrating another exemplary method for a communication partner to be verified according to the present disclosure.

The device 102 may implement an exemplary method 330 shown on FIG. 3B to process the nonce. At block 332, the device 102 may receive the nonce. Then at block 334, the device 102 may compute a verification value using a predefined function, which may be referred to as F2A. The function F2A may use both the private key of the device 102 and the received nonce to calculate the verification value. In some embodiments, similar to the function F1, the function F2A may be selected such that all bits of the nonce are necessary to start the computation, and the resulting bits are obtained simultaneously. For example, in one non-limiting embodiment, the function F2A may be an encryption of the nonce with the private key of the device 102. Then the method 330 may proceed to block 336, at which the verification value may be sent back to the terminal 110 as a response.

Referring back to FIG. 3A, after sending the nonce to the device 102, the exemplary method 300 may proceed from block 306 to block 308, at which a value may be received by the terminal 110. As described above with respect to FIG. 3B, the received value may be the verification value generated by the device 102 using the predefined function F2A. At block 309, the time at which the value is received is determined and a time duration between when the nonce was sent and the value received is determined or calculated.

At block 310, the time duration between the nonce being sent and the verification value being received is compared to a predefined time threshold $T_{th}$ (the time threshold $T_{th}$ having previously been discussed with respect to block 210). If the time between the nonce being sent and the verification value being received exceeds the predefined time threshold, this may indicate that the computation was performed by a device located at a distance greater than expected (or permitted) and the method may proceed to block 318 (or optionally to block 314).

If the time between the nonce being sent and the verification value being received is within the predefined time threshold, the method 300 proceeds to block 311 at which the received verification value may be processed. The processing may be performed by the terminal 110 using procedures specific to the function F2A used by the device 102.

In an embodiment, if the function F2A is to encrypt the nonce using the private key of the device 102 (as described above with respect to block 334), the processing may be done using a function (which may be referred to as F2B) that decrypts the received value using the public key of the device 102. The function F2B may decrypt the received value to recover the nonce. For example, in some embodiments, the terminal 110 may obtain a public key of the device 102, and ensure that the public key is properly certified by a trusted third party (e.g., a certificate authority). Such certification may mean that this public key corresponds to a specific private key, which belongs to a trusted device. Accordingly, based on the certification of the public key and the assumption that a trusted device does not expose its private key to any third parties, it can be assumed that calculation of the function F2A has actually been done at the trusted device and not somewhere else.

It should be noted that the public key of the device may be obtained at any time prior to or after receiving the verification value, as long as it is received before the processing of block 311 begins. For example, the public key may be stored in a volatile or non-volatile storage of the terminal 110 after it has been received during a previous communication session between the terminal 110 and a trusted third party, or may be installed on the terminal 110 by the vendor of the terminal 110.

At block 312 the decrypted value may be compared to the nonce sent to the device 102. If they are the same, at block 316 the method 300 may determine that the proximity verification has passed. Passing the proximity verification at block 316 may be interpreted as "the owner of the private key that corresponds to the public key used in block 311 is on the other end of the logical channel established in block 302, and within the proximity determined by $T_{th}$". In some embodiments, if the communication between the two communicating parties is through a protected logical channel (such as SSL/TLS connection(s) over the communication link), the process 300 may provide strong proximity and authentication assurances.

If either the time check at block 310 or the validation determination at block 312 fails, the method 300 may proceed to block 318, at which the method 300 may determine that the proximity verification has failed. For example, if the time check at block 310 or the validation determination at block 312 fails, the terminal 110 may determine that there is a possibility that the communication link 130 or the logical channel established over the communication link 130 has been compromised or that the device 102 may be a fake device.

In one or more embodiments, to handle occasional communication errors, the method 300 may attempt to repeat the blocks 304 - 312 as indicated by block 314, which may be optional. In some embodiments, the number of retransmission attempts may be limited (for example, to a number like 3 or 5 times).

Because the amount of time spent on calculation of the function F2A may affect the value of $T_{th}$, some embodiments may use a function F3 that can be computed faster than asymmetric encryption using a private key. It should be noted that both encryption and decryption of the nonce using asymmetric cryptography may take time in the order of tens of milliseconds, which may lead to the maximal radius of thousands of kilometers. Thus, in some embodiments, a predefined function F3 with a faster computing speed may be implemented. For example, a predefined function F3 that utilizes two parameters may be used such that one parameter may be the nonce, and the other may be a parameter V, which may be generated (in some embodiments, randomly) by the device 102.

In one embodiment, the function F3 may be a symmetric encryption function that uses the parameter V as the encryption key for a symmetric encryption of the nonce. The symmetric encryption, for example, may be implemented to complete within 100 nanoseconds, which is likely to be several orders of magnitude less than the asymmetric encryption of the same nonce. In another embodiment, the function F3 may be a hash function that computes a hash value of a concatenation of the nonce and the parameter V. It is to be understood that these embodiments are merely exemplary and that the scope of the present invention is broad enough to encompass any appropriate presently known or future-developed function F3.

Figure 4A:
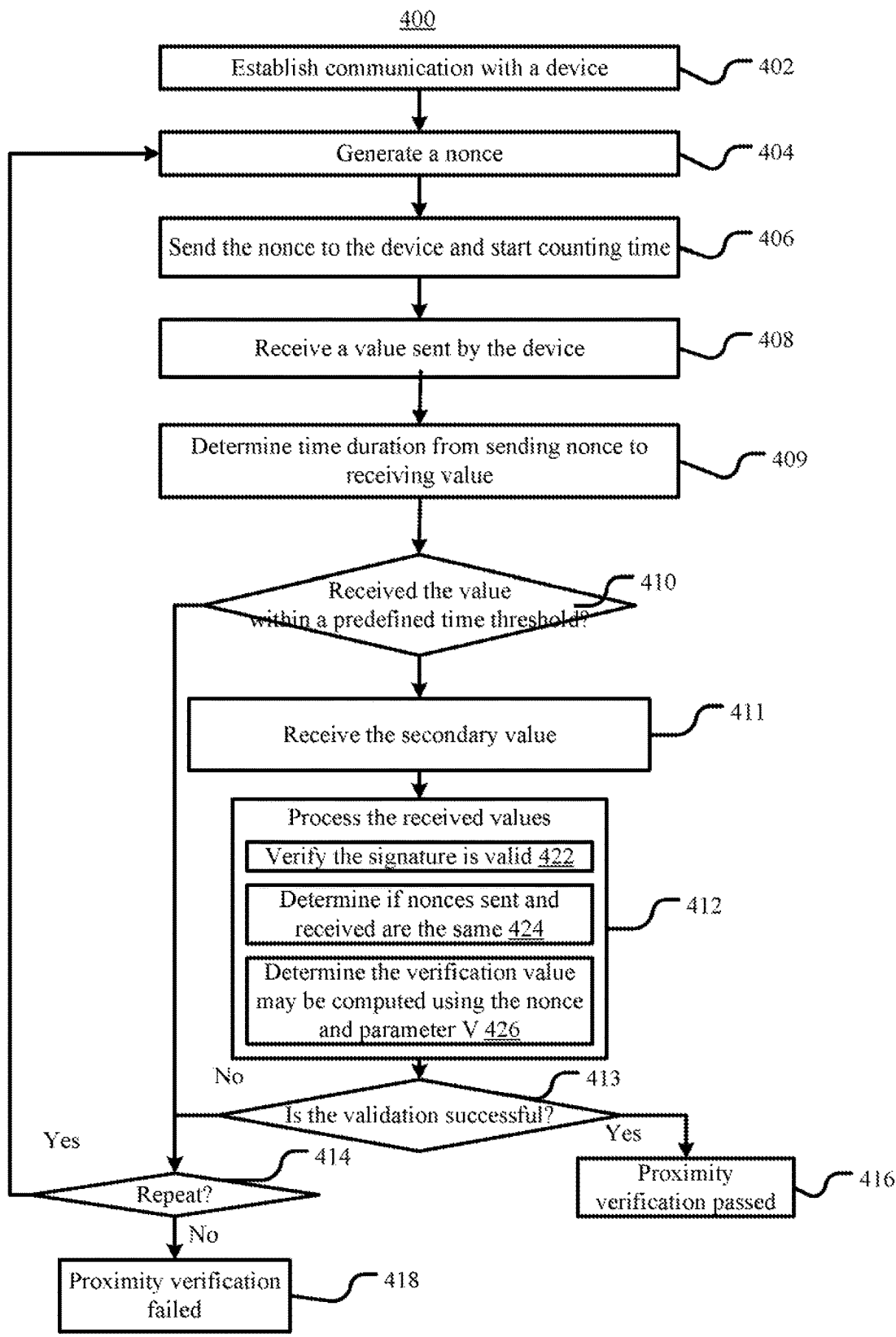
FIG. 4A is a flow diagram illustrating another exemplary method for verifying a communication partner according to the present disclosure.

FIG. 4A is a flow diagram of an embodiment in which an exemplary function F3 with a parameter V may be used in an exemplary method 400. In this embodiment, at block 402, the terminal 110 may establish communication with the device 102. At block 404, the terminal 110 may generate a nonce; and, at block 406, the terminal 110 may transmit the nonce to the device 102 as a request and start counting time. Blocks 402-406 may be similar to blocks 302-306 discussed previously.

Figure 4B:
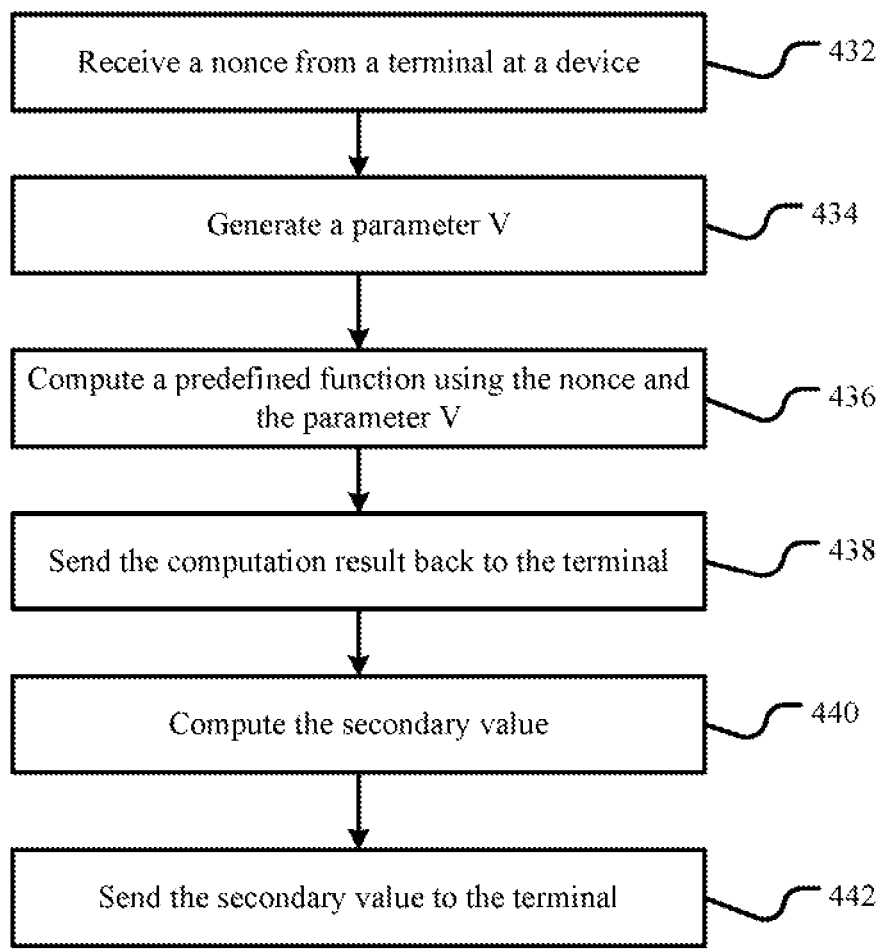
FIG. 4B is a flow diagram illustrating another exemplary method for a communication partner to be verified according to the present disclosure.

The device 102 may implement an exemplary method 430 shown in FIG. 4B corresponding to the exemplary method 400. At block 432, the device 102 may receive the nonce; at block 434, the device 102 may generate a value V. In one embodiment, the value V (which may also be referred to as parameter V) may be generated using a random number generator (not shown) and may be a random number that cannot be predicted and/or computed outside the device 102. In some embodiments, to speed up the processing within block 434, the value V may be pre-generated (as long as it is not previously disclosed outside the device 102). At block 436, the device 102 may compute a verification value by computing a predefined function F3 using both the nonce and the value V. For example, the function F3 may be comprised of symmetrically encrypting the nonce using parameter V as the encryption key. At block 438, the verification value may be sent to the terminal 110 as a response to the request.

Referring back to the exemplary method 400 on FIG. 4A, at block 408, the terminal 110 may receive the verification value from the device 102, and at block 409 may determine the time elapsed from sending the nonce until receiving the verification value. At block 410, the time elapsed may be compared to a predefined time threshold $T_{th}$. If the verification value is not received within the predefined time threshold $T_{th}$, then, at block 410, the method 400 may proceed to block 418 (or, optionally, to block 414).

The exemplary method 430 of FIG. 4B, in the meantime, may proceed from block 438 to block 440, at which, the device 102 may sign (or encrypt) the value of the nonce received at block 432 and the parameter V (i.e., the symmetric encryption key in the above example) with its private key. In another embodiment, the device may sign (or encrypt) the parameter V and the verification value with its private key. The result obtained after performing the calculations or operations of block 440 may be referred to as a secondary value. At block 442, the device 102 may send the secondary value to the terminal 110.

It should be noted that while operations within block 440 may take a significant amount of time (for example, on the order of 0.01 to 0.1 second), it does not affect $T_{th}$, which may be limited only by the speed of block 434, so $T_{th}$ values on the order of 1 μs (and even lower, depending on the communications link) may be used in embodiments similar to the one shown in FIGS. 4A and 4B.

Referring back to the exemplary method 400 in FIG. 4A, if at block 410, it is determined that the verification value is received within the predefined time threshold $T_{th}$, the method 400 may proceed to block 411, at which the terminal 110 may receive the secondary value. Then, at block 412, the terminal 110 may process the verification value and the secondary value by performing the exemplary processes shown in blocks 422, 424 and 426. For example, at block 422, using the public key of the device 102, the terminal 110 may verify the signature of (or decrypt) the received secondary value. At block 424, the value of the nonce sent to the device 102 may be compared to the value of the nonce received as part of the secondary value from the device 102. At block 426, the terminal 110 may compute the value of the function F3 using the nonce and the parameter V (which serves as a symmetric key in this example) received as part of the secondary value, and determine whether the computed value is the same as the verification value received from the device 102.

If the result of the computation at block 426 is the same as the verification value received from the device 102, at block 412 the validation is determined to be successful and the method 400 may proceed to block 416, at which the method 300 may determine that the proximity verification has passed (in case of the method 400, semantics of "proximity verification has passed" may be the same as the semantics of method 300). If either the time check at block 410 or the validation determination at block 413 fails, the method 400 may proceed to block 418, at which the method 400 may determine that the proximity verification has failed. If any one of the checks performed at blocks 422-426 fails, at block 413 the validation will be considered to have failed and the method proceeds to block 418 (or optionally block 414).

In an alternative embodiment of the methods 400 and 430, the verification value may be comprised of only the parameter V (which, as described with respect to method 430, may be generated by the device 102), and the secondary value may be comprised of the nonce and the verification value (i.e., the parameter V) signed with the private key of the device 102. The time duration between when the nonce is transmitted from the terminal to the device and when the verification value is received by the terminal may still be compared to a predetermined time threshold $T_{th}$, while recognizing that $T_{th}$ may need to be adjusted in view of the fact that the device 102 does not need to perform a function (e.g., function F, F2A, or F3) on the nonce before sending the verification value to the terminal. In such an alternative embodiment, the processing at block 412 may comprise of verifying the signature of the received secondary value, determining that the nonce included in the secondary value is the same as the one sent by the terminal to the device, and determining that the parameter V included in the secondary value is the same as the one that was included in the verification value.

Figure 5A:
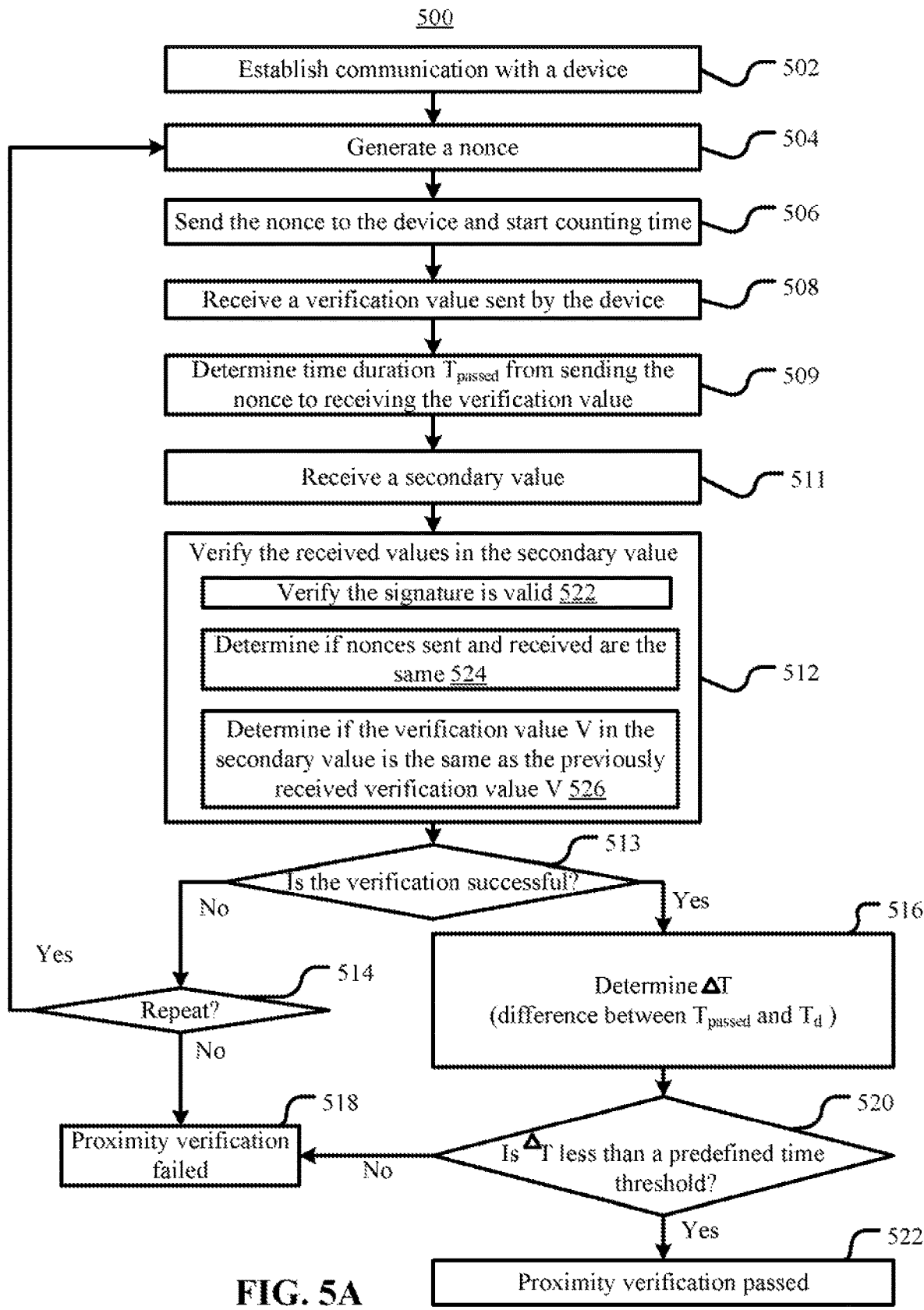
FIG. 5A is a flow diagram illustrating another exemplary method for verifying a communication partner according to the present disclosure.
Figure 5B:
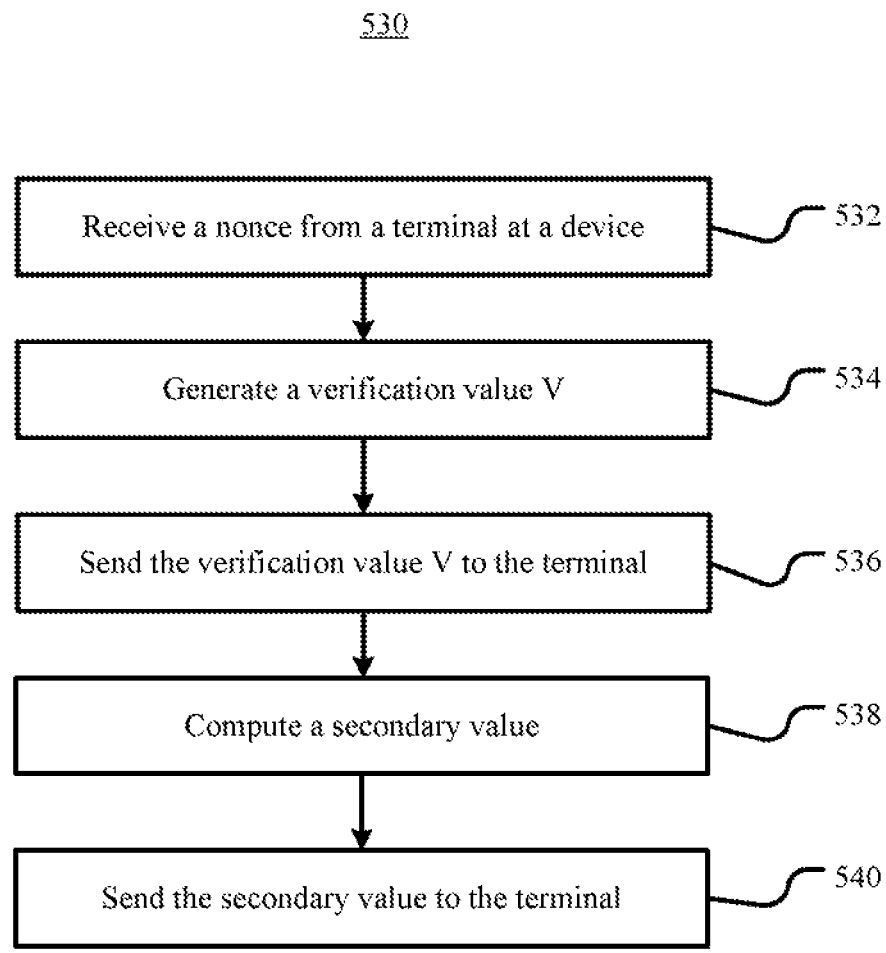
FIG. 5B is a flow diagram illustrating another exemplary method for a communication partner to be verified according to the present disclosure.

FIG. 5A is a flow diagram of another exemplary method 500 to be implemented by the terminal 110 according to the embodiment in which no predefined function may be necessary. FIG. 5B is a flow diagram of an exemplary method 530 to be implemented by the device 102 that corresponds to the method 500.

As shown in FIG. 5A, at block 502, the terminal 110 may establish communication with the device 102. At block 504, the terminal 110 may generate a nonce, and at block 506, the terminal 110 may send the generated nonce to the device 102 and start counting time.

With respect to FIG. 5B, the device 102 may receive the nonce at block 532 of the method 530. At block 534, the device 102 may generate a verification value V. This value may be a random number or any other value that cannot be predicted and/or computed outside the device 102. In some embodiments, to speed up the processing within block 534, the verification value V may be pre-generated so long as it has not previously been disclosed outside device 102 prior to block 536. For example, generation of the verification value V may, but need not, be performed before any communication between the device 102 and the terminal 110 is established or the nonce is received. Also, to avoid some kinds of replay attacks, it may be advantageous not to reuse verification values V; that is, to generate a new verification value V for each request.

At block 536, the device 102 may send the verification value V to the terminal 110. At block 538, the device 102 may compute a secondary value. In an exemplary embodiment, a time period $T_d$ may be determined or computed by the device 102. The time period $T_d$ may represent the duration (expressed, for example, in terms of nanoseconds) of time from when the nonce is received till when the verification value V is sent. For example, in one embodiment, $T_d$ may represent the duration of time from when the last bit of the nonce is received till when the first bit of the verification value V is sent. In such embodiments, the secondary value may be generated by signing, with a private key of the device 102, the nonce received at block 532, the verification value V generated at block 534 and the time period $T_d$.

At block 540, the generated secondary value may be sent to the terminal 110.

Referring back to the method 500 of FIG. 5A, at block 508, the terminal 110 may receive the verification value V sent by the device 102 and at block 509 determine the time $T_{passed}$ passed since the nonce has been sent at block 506.

At block 511, the terminal 110 may receive the secondary value. As described above, the secondary value may include signed values for the nonce, the verification value V, and the time period $T_d$. At block 512, the received values in the secondary value may be verified. For example, at block 522, using the public key of the device 102, the signature under the values received at block 511 may be verified; at block 524, the nonce received at block 511 may be compared to that generated at block 504; and, at block 526, the verification value V received at block 511 may be compared to that received at block 508. Then the method 500 may proceed to block 513, at which whether the verification is successful may be determined. For example, if all checks at blocks 522-526 are passed, the verification may be deemed as successful and the method may proceed to block 516. If one of the checks at blocks 522-526 fails, the verification may be considered failed, and the method may proceed to the block 518 (or, optionally, to the block 514).

At block 516, a difference ΔT between $T_{passed}$ (the time duration from sending the nonce to receiving the verification value V measured at step 509) and the time duration $T_d$ (received as a part of secondary value, for example, at block 511) may be computed. If, at block 520, this difference ΔT is found to be less than a predefined time threshold $T_{th}$, then, at block 522, the proximity verification may be deemed as passed successfully. If, at block 520, this difference ΔT is found to be more than a predefined time threshold $T_{th}$, the proximity verification may be deemed failed, and the method may proceed to block 518 (or, optionally, to block 514).

It should be noted that, when signature of the secondary value is used, the signature may be implemented by encrypting the whole or a part of the secondary value by the private key of the device 102; in this case the signature verification may be implemented as decryption using a public key that corresponds to the private key of the device 102.

In some embodiments, in addition to or instead of using a digital signature to identify the device 102, any kind of message authentication code (MAC) involving the secret key of the device 102 may be used.

In some embodiments, other parameters, such as the current time and date, may be added to the verification value and/or the secondary value computed or generated by the device 102. Such additional parameters may be used to enhance the validation process. For example, the terminal 110 may check whether the time and date included in the verification value correspond to the time and date included in the secondary value (for example, within plus/minus one day). If such checks fail, this may serve as an indication of package inconsistency and, ultimately, may lead to a determination that the proximity verification failed.

In those embodiments that implement an encrypted channel (such as, SSL, TLS, or Secure Shell (SSH)) over the link 130, it may be sufficient that the nonce is sent from the terminal 110 to the device 102 over this encrypted channel, and then is simply replied back. The time duration may be measured from when the message containing the nonce is sent to when the reply is received. It should be noted that the time needed to decrypt the nonce at the device 102 when it leaves the encrypted channel and to encrypt it when it enters the encrypted channel on the way back may affect the value of $T_{th}$ (both decryption and encryption mentioned above are performed as part of the standard SSL or TLS communication). In such embodiments, if the proximity verification passes successfully, it may be assumed that the encrypted channel is established with a device 102 that is within the predefined proximity. On the other hand, if the proximity verification fails, it may indicate that the device 102 is not within the predefined proximity as expected. If the proximity verification fails, in some embodiments, for security reasons, communication over the encrypted channel may be terminated.

In other embodiments using methods 300, 400 or 500 for proximity verification, wherein an encrypted channel is not used at the time of proximity verification, if the proximity verification is passed successfully, the public/private key pair may be used to subsequently establish a secure channel (e.g., an encrypted channel), and/or to sign messages sent over the communication link 130 (or over the logical channel over the communication link 130). In these embodiments, it may be assumed that the secure channel is established with and/or the messages are sent by (received from) a device 102 that at the time of the proximity verification was within the predetermined proximity.

In some embodiments, a method based on combining the method 400 with reporting the time $T_d$ spent by the device 102 on message processing (as described above) may be used. For example, in one of such embodiments, the terminal 110 may perform measurement of $T_{th}$ in the software that sends the request and receives the response (for example, within a process or software application running on the terminal 110). The time $T_d$ may be measured at the device 102 by the software that receives the request and sends back the response (for example, by a process or a software application running on the device 102). In some of such embodiments, $T_{th}$ may be alternatively calculated, for example, as $T_{th} = T_d + T_{term} + T_{dev}$, where $T_d$ may be received from the device 102 (for example, calculated at the application level as the time between receiving a request and sending a response in software), $T_{term}$ may represent typical (or maximum) time delays at the terminal 110, and $T_{dev}$ may represent typical (or maximum) unaccounted time delays (outside of interval $T_d$) at the device 102. In some embodiments, $T_{dev}$ may depend on the type of the device 102. For example, the terminal 110 may have (or have access to) a database storing $T_{dev}$ (DBT, not shown) for each of known type of the device 102. The type of the device 102 may be derived, for example, from a public key of the device 102. In one non-limiting example, the terminal 110 may search a database of public keys (DBK, not shown) and locate the type of the device 102 based on the public key of the device 102. Alternatively, the device 102 may send its type to the terminal 110, for example, as an additional field in the secondary value, which may be signed by the private key of device 102. In some embodiments, instead of using the databases DBT and/or DBK, the terminal 110 may send a request to a server (not shown) to obtain necessary information.

In one non-limiting exemplary embodiment, the terminal 110 may be a POS terminal, and the device 102 may be a payment device such as a contactless smartcard or an NFC-enabled phone. The terminal 110 may send to and receive from the device 102 usual smartcard Application Protocol Data Unit (APDU) requests/responses. At least some of the usual requests/responses may include a digital signature or MAC generated by the device 102. A special APDU request/response may be added after one or more of such usual APDU requests/responses. The response in this special APDU request/response may include the time $T_d$ for a previous usual APDU request/response. In some embodiments, the time $T_d$ may be signed or may have an associated MAC generated by the device 102. Moreover, in some embodiments, the signature or the associated MAC may be generated using a unique identifier of the previous usual APDU request.

In some embodiments, it may be necessary to include the unique identifier of the previous usual request into signature/MAC calculation to avoid replay attacks in which an attacker may try to use a previously recorded special APDU with $T_d$ associated with a different APDU request/response. It should be understood that in such embodiments all requests may be unique. To achieve this, each APDU request, in addition to other data, may, for example, have a nonce as one of its fields. The unique identifier may be, for example, a hash value of the request, or the nonce.

The time $T_d$ may be included into APDU responses in a number of ways. For example, in some cases $T_d$ for a preceding APDU may be included into a subsequent response of a special APDU request/response. Alternatively, a usual APDU request/response may be extended to contain $T_d$ for the previous APDU request/response pair. In another alternative, an APDU response may include an estimate of timing for itself as an upper-bound estimate by the device 102, and the device 102 may wait until the estimated time elapses (at application level) before sending the APDU response.

In some embodiments, the terminal 110 may set $T_{th}$, for example, between $T_d+10$ ms and $T_d+50$ ms, with the number of retransmission attempts (similar to that of blocks 214, 314, 414, and 514) limited to a number from 3 to 5. In any case, similar to the methods 200, 300, 400, and 500 above, the terminal 110 may deny payment if $T_{th}$ is exceeded.

In yet another embodiment, based on method 500 described above, two special APDU request/response pairs may be used. In the request of the first special APDU request/response pair the terminal 110 may send a nonce, and in the response of the first special APDU request/response pair the device 102 may send a verification value. The device 102 may measure the time $T_d$ spent on preparation of this response and include the measured $T_d$ in the response of the second special APDU request/response pair. In this embodiment, no modification to usual APDUs (such as adding nonces) is necessary.

In a yet another non-limiting exemplary embodiment, the terminal 110 may be a POS terminal, and device 102 may be a payment device such as a contactless smartcard or an NFC-enabled phone. To perform proximity verification, a method, similar to method 300 described above, may be used as follows. The terminal 110 may send and receive usual smartcard APDU requests/responses, setting $T_{th}$, for example, to a fixed number depending on the nature of the APDU request. The $T_{th}$ may be set according to APDU commands, which may include some kind of signature (or MAC) generated by the device 102. In some embodiments, $T_{th}$ may be pre-set, for example, to a value between 100 and 300 ms for an APDU request that requires calculating a signature or MAC. In some embodiments, the device 102 may wait for a pre-defined time (for example, $T_{th}$–50 ms to $T_{th}$–10 ms) before sending such APDU responses. Waiting by the device 102 for a pre-defined time may ensure that processing of all requests take roughly the same time regardless of computational capabilities of the device 102. In such embodiments, if the terminal 110 receives the response before the pre-defined time, it may indicate that the device 102 does not wait as expected, and therefore may be compromised and correspondingly, the terminal 110 may refuse further communication.

In yet another embodiment, $T_{th}$ may be a function of the device type of the device 102. The terminal 10 may determine the type of the device 102 as described above, for example, by receiving it from the device 102 or looking up the type information in some external database based on a public key of the device 102. Based on the device type, for example, $T_{th}$ may be set to lower values for faster-performing devices and to higher values for slower-performing devices. In some other embodiments, $T_{th}$ may be a function of both the type of the device 102 and the nature of the command. Again, as an additional protective measure, if the terminal 110 receives the response faster than expected for such a device and/or command, the device 102 or the communication channel may be deemed compromised, and the terminal 110 may terminate communication.

Those with skill in the art understand that the method 300 or method 400 may be initiated by the device 102 to ensure that the terminal 110 is in close proximity, too. In certain embodiments, the same methods 300 and 330 (or methods 400 and 430) may be performed by both sides of a communication link for mutual proximity verification.

In some cases, for example, for privacy reasons, it may be preferable to provide a communication partner with attestation credentials only after proximity and credentials of the communication partner are verified. For example, in one embodiment, the terminal 110 may be a door lock and the device 102 may be a key card. In this embodiment, it may be important that a public key of the key card is not revealed to every terminal, but only to an intended door lock. To address this problem, when the communication between the terminal 110 and the device 102 is established, the device 102 may first verify that the terminal 110 is within a predefined proximity and has a private key that corresponds to a public key known to belong to this terminal. For example, the key card may obtain the public key from a trusted third party and perform such verification using one of methods 300 or 400 described above. If this verification is passed successfully, the device 102 may act respectively (as described in one of methods 330 or 430) to provide its proximity to the terminal 110.

In some embodiments, devices or terminals according to the present disclosure may have hardware accelerators for computing the functions F1, F2A and/or F3. By way of example and not limitation, the functions F1, F2A and/or F3 may be implemented in one or more ASICs such that their execution time (e.g., respectively or in combination) may be less than it would otherwise need when using modern general-purpose CPUs. This may reduce the possibility that an attacker may perform such computations fast enough using a general purpose CPU. Further, this may be particularly useful in situations in which the ASIC implementing the functions F1, F2A and/or F3 is a specialized device such that its manufacture, dissemination and/or use is controlled or monitored to eliminate (or at least greatly reduce) the possibility that an attacker may gain access to such an operational ASIC.

In some embodiments, as described above, the proximity verification processes according to the present disclosure may use connection-based communication. In some other embodiments, the proximity verification processes described above may also be applied to message-based (connectionless) communication.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application— such as by using any combination of microprocessors, microcontrollers, field programmable gate arrays (FPGAs), application specific integrated circuits (ASICs), and/or System on a Chip (SoC)—but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. An apparatus for ensuring proximity of a computing device, comprising:
    a communication port; and
    a processor configured to:
        obtain a first nonce;
        send a request that includes the first nonce to the computing device via the communication port, and start measuring a time interval;
        receive a response comprising a first parameter from the computing device via the communication port, and end measuring the time interval;
        receive a message from the computing device via the communication port, the message including a second value;
        obtain, from the second value, a second nonce, a second parameter, and a time period Td, wherein the time period Td represents a time period from the request being received at the computing device to the response being sent from the computing device;
        compute a time difference $\Delta T$ between the measured time interval and the time period Td;
        determine that the first nonce and the second nonce are equal;
        determine that the first parameter and the second parameter are equal; and
        determine that the computing device is a trustworthy device upon the determination that the time difference $\Delta T$ is less than a predefined time threshold.

2. The apparatus of claim 1, wherein the message further includes authentication data that authenticates the second value and wherein the processor is further configured to authenticate the second value using the authentication data.

3. The apparatus of claim 2, wherein the authentication data is a message authentication code (MAC) and to authenticate the second value comprises to verify the MAC using a secret key of the computing device.

4. The apparatus of claim 2, wherein the processor is further configured to send to the computing device smartcard Application Protocol Data Unit (APDU) requests and receive from the computing device APDU responses.

5. The apparatus of claim 4, wherein one subsequent APDU response contains the time period Td representing a time period from a previous APDU request being received at the computing device to a previous APDU response being sent from the computing device.

6. The apparatus of claim 5, wherein the previous APDU response contains a signature or message authentication code (MAC) as the authentication data.

7. The apparatus of claim 6, wherein the signature or MAC is generated using a unique identifier of the previous APDU request.

8. The apparatus of claim 1, wherein the first parameter is a first verification value and the second parameter is a second verification value.

9. A method for ensuring proximity of a computing device, comprising:
    obtaining a first nonce at an apparatus;
    sending a request including the first nonce to the computing device via a communication port of the apparatus, and starting measuring a time interval;
    receiving a response comprising a first parameter from the computing device via the communication port, and ending measuring the time interval;
    receiving a message from the computing device via the communication port, the message including a second value;
    obtaining, from the second value, a second nonce, a second parameter, and a time period Td, wherein the time period Td represents a time period from the request being received at the computing device to the response being sent from the computing device;
    computing a time difference $\Delta T$ between the measured time interval and the time period Td;
    determining that the first nonce and the second nonce are equal;
    determining that the first parameter and the second parameter are equal; and
    determining that the computing device is a trustworthy device upon a determination that the time difference $\Delta T$ is less than a predefined time threshold.

10. The method of claim 9, wherein the message further includes authentication data that authenticates the second value and wherein the method further comprises authenticating the second value using the authentication data.

11. The method of claim 10, wherein the authentication data is a message authentication code (MAC) and to authenticating the second value comprises verifying the MAC using a secret key of the computing device.

12. The method of claim 10, further comprising sending to the computing device smartcard Application Protocol Data Unit (APDU) requests and receiving from the computing device APDU responses.

13. The method of claim 12, wherein one subsequent APDU response contains the time period Td representing a time period from a previous APDU request being received at the computing device to a previous APDU response being sent from the computing device.

14. The method of claim 13, wherein the previous APDU response contains a signature or message authentication code (MAC) as the authentication data.

15. The method of claim 14, wherein the signature or MAC is generated using a unique identifier of the previous APDU request.

16. The method of claim 9, wherein the first parameter is a first verification value and the second parameter is a second verification value.

* * * * *